Dec. 21, 1926.　　　　　　　　　　　　　　　　　　1,611,343
E. E. EHRICH
DRIVE FOR EXTRACTORS
Filed March 6, 1922
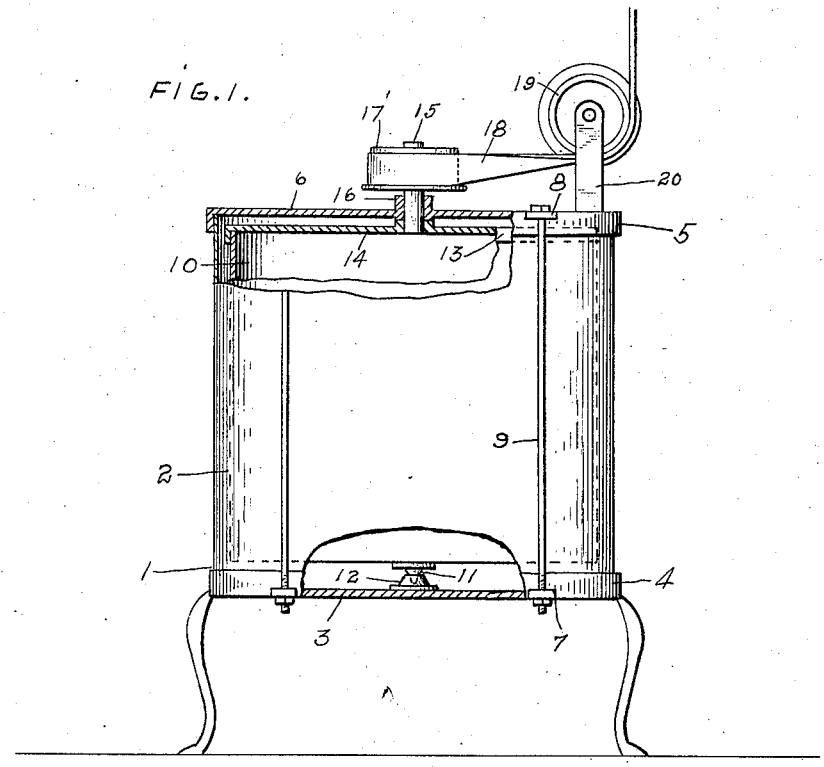
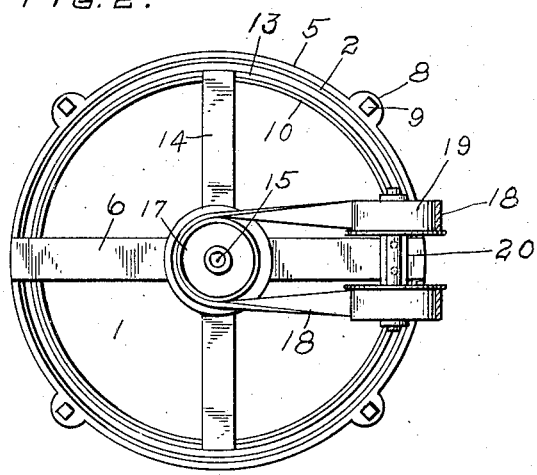
INVENTOR
EDWARD E. EHRICH
BY
ATTORNEY Patented Dec. 21, 1926.

1,611,343

UNITED STATES PATENT OFFICE.

EDWARD E. EHRICH, OF INDIANAPOLIS, INDIANA.

DRIVE FOR EXTRACTORS.

Application filed March 6, 1922. Serial No. 541,564.

This invention relates to a drive for extractors, and particularly that class employed for cleansing clothing with gasoline or similar substances, and the prime feature of the invention is the provision of a belt drive for the revolving cage of the extractor, which drive is so positioned that undue wear or vibration of the cage will be practically eliminated.

A further feature of the invention is the provision of a bearing for the lower end of the cage.

Other objects and advantages will be hereinafter more fully set forth and pointed out in the accompanying specification.

In the accompanying drawings,

Figure 1 is a side elevation of an extractor with parts broken out, and

Figure 2 is a top plan view of the extractor showing the revolving cage or basket rotated to a position substantially at right angles to that shown in Figure 1.

Referring to the drawings, 1 indicates an extractor, such as is used primarily for cleaning clothing, said extractor consisting of an outer casing 2, preferably constructed of sheet metal and having a bottom 3 on which is formed a flange 4 for the reception of the lower end of the casing 2, while a band 5 is introduced around the upper end of the casing 2, the downward movement of the band being limited by means of a cross bar 6.

The bottom portion 3 and the band 5 are provided with registering ears 7 and 8 respectively, through which are extended rods 9, and by means of which the bottom 3, band 5 and casing 2 are locked together.

Rotatably mounted within the casing 1 is a cage or basket 10 which is likewise preferably constructed of sheet metal, the bottom portion of the cage having a point bearing 11 which is preferably tapered substantially to a point, said point bearing entering a bearing cup 12 mounted upon the bottom 3, the bearing 11 and cup 12 being secured to their respective parts in any suitable manner.

Surrounding the upper end of the cage 10 is a band 13 to which is connected a cross arm 14, the band being fixed to the cage in any suitable manner. Fixed to the cross arm 14, at the axial center of the cage 10, is a shaft 15 which projects upwardly through a bearing 16 on the cross bar 6 and has fixed to its upwardly extending end a belt pulley 17 around which passes a driving belt 18, and in the event that the belt is operated from a line shaft positioned above the extractor, the belt 18 will pass around idler pulleys 19 which are in turn supported from a bracket 20 fixed to the cross bar 6.

By providing the point bearing at the lower end of the cage and by attaching the driving pulley at the upper end of the cage and positioning the same immediately above the cross bar 6, any vibrations of the cage will be practically eliminated, and also any unusual wear on these parts.

Furthermore, the walls of the casing and cage may be constructed of relatively light material without detracting from their durability or the operation of the device when used for cleaning purposes.

It will further be seen that by entering the point bearing in the bearing cup and having the cross arm 14 immediately below and a part thereof resting against the under face of the cross bar, it will be impossible for the point bearing to leave its seat through centrifugal force when the cage is in operation.

Having thus fully described my said invention, what I claim as new and desire to secure by Letters Patent, is:

An extractor comprising a casing, a cage revolvably supported within the casing, a peripheral band mounted at the top of said cage said band being freely removable and having an integrally formed bar extending diametrically across the same and provided with an upstanding bearing portion, a second similar band at the top of said casing having an integrally formed bar extending diametrically across the same said bar having a bearing midway thereof extending over and in contact with the upstanding bearing portion on the cage, means for holding the band on said casing, a shaft secured to the cage and extending through the bearing in the bar on the band of the casing, and means for rotating said shaft, substantially as set forth.

In witness whereof, I have hereunto set my hand and seal at Indianapolis, Indiana, this 3rd day of March, A. D. nineteen hundred and twenty-two.

EDWARD E. EHRICH. [L. S.]